United States Patent
Wee et al.

(10) Patent No.: US 7,957,309 B1
(45) Date of Patent: *Jun. 7, 2011

(54) UTILIZING MULTIPLE DISTORTION MEASURES

(75) Inventors: Susie J. Wee, Palo Alto, CA (US); Carri Chan, Stanford, CA (US); John G. Apostolopoulos, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

This patent is subject to a terminal disclaimer.

(21) Appl. No.: 11/787,606

(22) Filed: Apr. 16, 2007

(51) Int. Cl.
*H04J 1/16* (2006.01)

(52) U.S. Cl. ..... 370/252; 370/229; 370/230; 370/395.4; 370/395.65

(58) Field of Classification Search .......... 370/229–230, 370/252
See application file for complete search history.

(56) References Cited

U.S. PATENT DOCUMENTS

| 6,014,694 | A * | 1/2000 | Aharoni et al. | 709/219 |
|---|---|---|---|---|
| 6,754,203 | B2 * | 6/2004 | Wah et al. | 370/352 |
| 7,433,329 | B2 * | 10/2008 | Qian | 370/310 |
| 7,684,331 | B2 * | 3/2010 | Chan et al. | 370/235 |
| 2004/0017853 | A1 * | 1/2004 | Garrido et al. | 375/240.16 |
| 2004/0196961 | A1 * | 10/2004 | Freundlich et al. | 379/52 |
| 2005/0169175 | A1 * | 8/2005 | Apostolopoulos | 370/230 |
| 2006/0146182 | A1 * | 7/2006 | Brangoulo et al. | 348/397.1 |
| 2008/0259799 | A1 * | 10/2008 | van Beek | 370/235 |

* cited by examiner

*Primary Examiner* — William Trost, IV
*Assistant Examiner* — Ashil Farahmand

(57) ABSTRACT

Utilizing multiple distortion measures. A first distortion measure for at least one packet is received. A second distortion measure for the at least one packet is received, wherein the second distortion measure is different than the first distortion measure. A processing operation is performed based at least in part on the first distortion measure and the second distortion measure.

12 Claims, 8 Drawing Sheets

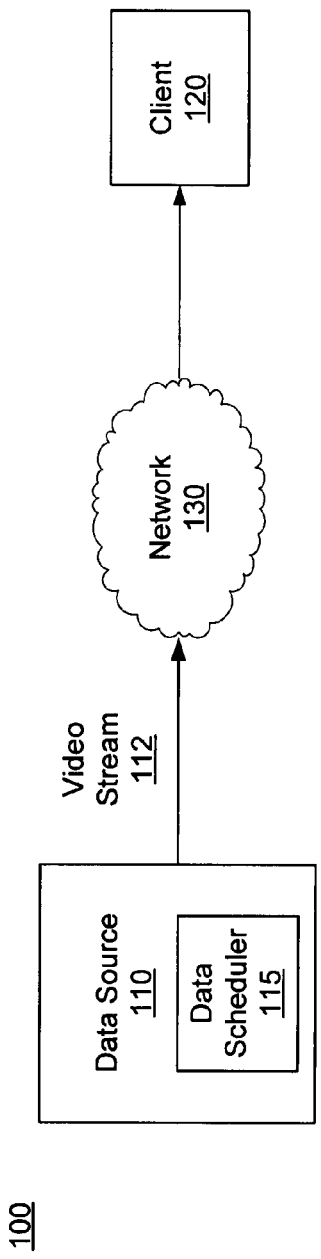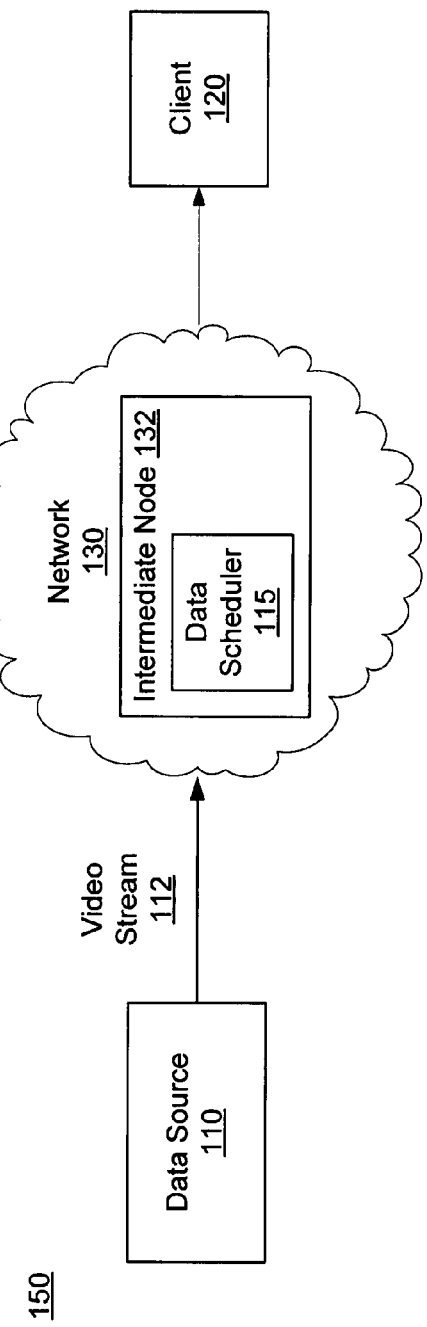

400

---

Receive a plurality of data packets comprising at least a subset of data packets, wherein the subset of data packets is associated with one media unit and comprises different quality information.
410

↓

Determine profit-to-size ratios for the data packets.
420

↓

If a lower quality level packet associated with the media unit has a larger profit-to-size ratio than a higher quality layer packet associated with the media unit, fuse the lower quality layer packet and the higher quality layer packet into a fused packet.
430

↓

Determine a plurality of schedules of the data packets for a plurality of data rates based at least in part on the profit-to-size ratios utilizing dynamic programming.
440

> Determine a plurality of schedules of the data packets for a plurality of data rates based at least in part on a quality information precedence constraint of the data packets, wherein a schedule comprising a higher quality level packet associated with the media unit also comprises at least a lower quality level packet associated with the media unit.
> 442

Utilizing dynamic programming to determine the plurality of schedules.
450

> Arrange data packets in order of profit-to-size ratio.
> 452

> Solve the PCKP for the data packets.
> 454

↓

Determine a set of embedded schedules based at least in part on the plurality of schedules, wherein an embedded schedule for a particular rate comprises packets for the particular rate and packets for lower rates.
460

Figure 4

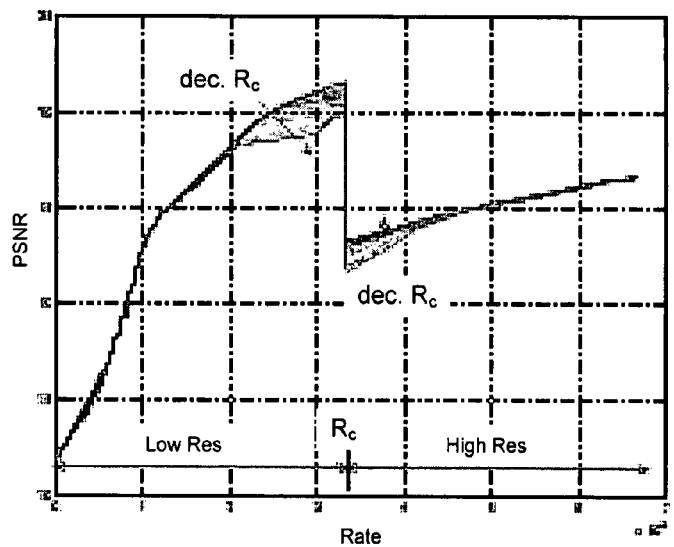
Figure 8
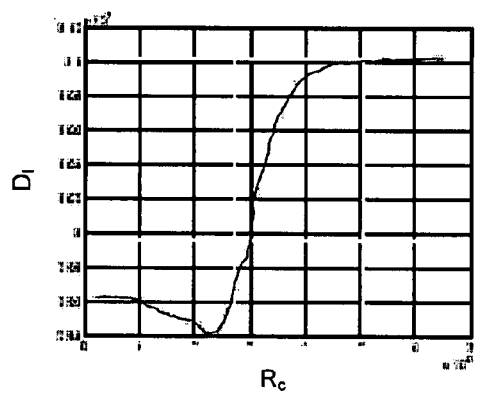 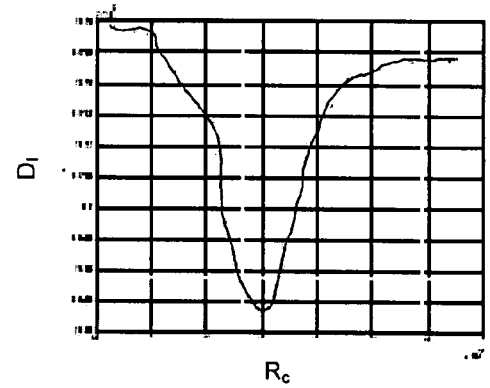
Figure 9A                   Figure 9B

UTILIZING MULTIPLE DISTORTION MEASURES

FIELD

Various embodiments of the present invention relate to the field of streaming media.

BACKGROUND

Wireless streaming environments present many challenges for the system designer. For instance, clients can have different display, power, communication, and computational capabilities. In addition, wireless communication links can have different maximum bandwidths, quality levels, and time-varying characteristics. A successful wireless video streaming system must be able to stream video to heterogeneous clients over time-varying wireless communication links, and this streaming must be performed in a scalable manner. Scalability is needed to enable streaming to a multitude of clients with different device capabilities.

Streaming media delivery systems typically code media streams once and then stream it to receivers under different network conditions. Currently, typical media delivery systems transmit data in order of resolution, from lowest to highest, scanning from top to bottom. The order of packet transmission is referred to as a schedule.

Often, packets are transmitted over noisy, time-varying channels. In these situations, it is desirable to be able to quickly adapt the media for the different network conditions, and to do so in a manner that provides the highest quality media possible for each rate.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 1A and 1B are block diagrams of example systems upon which various embodiments of the present invention may be practiced.

FIG. 4 is a flowchart illustrating a process for scheduling data packet transmission, in accordance with one embodiment of the present invention.

FIG. 8 is a graph illustrating an example plot of PSNR versus transmission rate, in accordance with an embodiment of the present invention.

FIGS. 9A and 9B are graphs illustrating an example plot of integral distortion versus changing rate, in accordance with an embodiment of the present invention.

Figure 2:
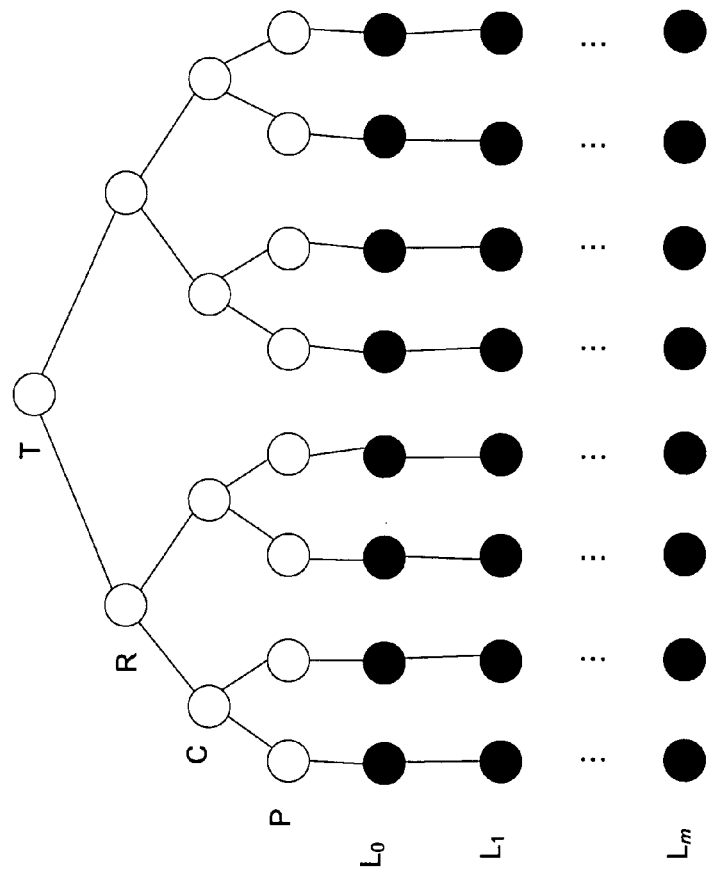
FIG. 2 is an example tree structure of scalable packet dependencies, in accordance with one embodiment of the present invention.

The drawings referred to in this description should not be understood as being drawn to scale except if specifically noted.

DESCRIPTION OF EMBODIMENTS

Various embodiments of the present invention, utilizing multiple distortion measures, are described herein. In one embodiment, a first distortion measure for at least one packet is received. A second distortion measure for the at least one packet is received, wherein the second distortion measure is different than the first distortion measure. A processing operation is performed based at least in part on the first distortion measure and the second distortion measure.

In one embodiment, a plurality of packet transmission schedules of scalably coded data packets is received, wherein each of the plurality of packet transmission schedules is for ordering packet transmission at one data rate. Distortion measures for at least two schedules of the plurality of schedules are determined. In one embodiment, the distortion measures are used for adapting processing of packet transmission. In one embodiment, an embedded multiple rate packet transmission schedule is generated based at least in part on the multiple distortion measures, wherein the embedded multiple rate packet transmission schedule is for ordering packet transmission at the plurality of data rates.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Various embodiments of the present invention, scheduling packet transmission, are described herein. In accordance with one embodiment of the present invention, a method for scheduling packet transmission is provided. A plurality of data packets is received, wherein at least a portion of the plurality of data packets is associated with one media unit and comprises different quality information. Profit-to-size ratios or distortion-to-size ratios for the data packets are determined. A plurality of schedules of the data packets are determined utilizing dynamic programming for a plurality of data rates based at least in part on the profit-to-size ratios or distortion-to-size ratios. Distortion and profit are two ways of referring to the value of a packet. It should be appreciated that while the embodiments of the present invention are described in the context of profit, embodiments of the present invention may also utilize distortion as well. Distortion and profit refer to quantified measures of distortion, such as squared error or sum of absolute differences, or perceptual measures of distortion, or any other expression for the absolute or relative importance of a media packet.

Embodiments of the present invention provide for scheduling packet transmission. In various embodiments, subsets of packets, also referred to as schedules, are selected for minimizing distortion subject to varying rate constraints. Embodiments of the present invention utilize dynamic programming to determine a plurality of schedules for transmitting packets at different transmission rates. In one embodiment, dynamic programming is utilized to solve a Precedence Constraint Knapsack Problem (PCKP) considering the dependencies of certain types of packets for the schedules at a plurality of transmission rates. In one embodiment, embedded schedules are generated by fusing together particular packets.

FIGS. 1A and 1B are block diagrams of example systems upon which various embodiments of the present invention may be practiced. With reference first to FIG. 1A, system 100 is shown, in accordance with an embodiment of the present invention. System 100 includes data source 110 and client 120 communicatively coupled over network 130. Data source 110 includes data scheduler 115. In system 100, media (e.g., video, images, audio, graphics, text, data) data is streamed to clients, e.g., client 120, via a wired or wireless link. In one embodiment, data scheduler 115 is operable to generate at least one packet transmission schedule for use in transmitting data packets. It should be appreciated that data scheduler 115 can be implemented as software, hardware, firmware, or any combination thereof. Moreover, it should be appreciated that system 100 may include additional components that are not shown so as to not unnecessarily obscure aspects of the embodiments of the present invention.

Although the embodiments of the present invention are described with respect to the streaming of video data, it should be understood that embodiments of the present invention are not limited to the streaming of video data. It should be appreciated that embodiments of the present invention also apply to other types of media, including without limitation: audio-based data, image-based data, graphics data, video-based data, text-based data, web page-based data, and the like.

In the present embodiment, data source 110 generates a video stream 112 that is sent to client 120 over network 130. In one embodiment, data source 110 includes a transcoder (not shown) for transcoding video stream 112 into a lower-bandwidth video stream. It should be appreciated that the transcoder can be located at any node between data source 110 and client 120, e.g., an intermediate transcoding node within network 130.

With reference first to FIG. 1B, system 150 is shown, in accordance with another embodiment of the present invention. System 150 includes data source 110 and client 120 communicatively coupled over network 130. Network 130 includes intermediate node 132 including data scheduler 115. In one embodiment, intermediate node 132 includes a transcoder (not shown) for transcoding video stream 112 into a lower-bandwidth video stream. In system 150, media (e.g., video) data is streamed to clients, e.g., client 120, via a wired or wireless link. In one embodiment, data scheduler 115 is operable to generate at least one packet transmission schedule for use in transmitting data packets. It should be appreciated that the components of system 150 operate in a similar manner as the corresponding components of system 100 of FIG. 1A. System 150 illustrates a different configuration of the components of system 100.

Referring to FIGS. 1A and 1B, both systems 100 and 150 use data scheduler 115 to generate schedules for the transmission of packets using a plurality of transmission rates. In general, streaming media delivery systems typically code media streams once and then stream it to receivers under different network conditions. In these systems, it is desirable to be able to quickly adapt the media for the different network conditions, and to do so in a manner that provides the highest quality media possible for each rate. Scalable coding schemes enable adaptation by allowing rate reduction to be performed by simply discarding data units from the coded media stream. For instance, embodiments of data scheduler 115 are operable to determine which data units to drop to achieve the highest quality possible.

Embodiments of the present invention determine a subset of packets, e.g., a schedule, of a media stream that should be selected to achieve a specified transmission rate. In one embodiment, a schedule includes only full packets. In one embodiment, all packets are independent of each other, in which rate and distortion are purely additive across different packets. However, this is generally not the case as most compression standards introduce dependencies between coded packets. Despite the dependencies, a schedule, $S(R)$, can be found for a given rate R, using the Precedence Constraint Knapsack Problem (PCKP). An efficient algorithm exists that solves PCKP in $\Theta(kR)$ where k is the total number of packets and R is the rate constraint. However, PCKP only finds $S(R)$ for a single rate R. Embodiments of the present invention find schedules for a plurality of rates, e.g., r=1, 2, 3, ..., R with byte-level granularity, using this solution requires R executions of the PCKP algorithm and a resultant running time of $\Theta(kR^2)$. Embodiments of the present invention provide a more efficient determination of the same schedules as in PCKP, but computes it with a running time of $\Theta(kR)$.

Embodiments of the present invention utilize scalable coding standards, e.g., JPEG-2000 scalable image coding, MPEG-4 Scalable Video Coding, H.264 Scalable Video Coding, MPEG Scalable Advanced Audio Coding (Scalable AAC), scalable vector graphics (SVG), and proprietary scalable coding methods. Embodiments of the present invention also utilize coding methods that traditionally are not referred to as scalable such as JPEG, MPEG-1, MPEG-2, MPEG-4, H.261, H.263, and H.264 as well as non-standard codecs. In various embodiments, the fact that media packets have different value or importance, represented by profit or distortion values, and different size is exploited. Embodiments of the present invention use profit-to-size ratios or distortion-to-size ratios to represent the value of a media packet.

Each media bitstream, e.g., JPEG-2000 bitstream, is made of independently parsable media packets, e.g., JPEG-2000 packets, and allows successful decoding with just a subset of these packets; therefore, rate-reduction is possible by simply discarding packets. While embodiments of the present invention are described with reference to the JPEG-2000 coding standard, it should be appreciated that embodiments of the present invention may utilize other coding standards and methods such as those listed above that implement independently parsable packets.

In one embodiment, JPEG-2000 coded images using mean-squared error (MSE) as a distortion measure are used. FIG. 2 is an example tree structure 200 of scalable packet dependencies, e.g., for JPEG-2000, in accordance with one embodiment of the present invention. Each JPEG-2000 packet contains data for a single tile (T), resolution level (R), color-component (C), precinct (P), and quality layer. More generally, in one embodiment, a tile is a media unit of a frame.

In one embodiment, a TRCP tag is defined as the set of JPEG-2000 packets (one for each quality layer) that belong to a specified JPEG-2000 tile, resolution level, color-component, and precinct (TRCP). It should be noted that the original ordering of encoding can vary as packets may be reordered by the scheduling of the described embodiments. It is assumed that JPEG-2000 packets across different TRCP tags are independent when using orthogonal filters, e.g., when 9/7 tap biorthogonal filters are used. However, this is not the case across quality layers, which are dependent in a linear fashion.

FIG. 2 illustrates the dependencies of JPEG-2000 packets. The black circles are actual JPEG-2000 packets while the white circles are abstractions to show the JPEG-2000 structure. Note for n TRCP tags and m layers in each tag, the number of JPEG-2000 packets is k=mn.

In solving for rate-distortion (RD) schedules, the distortion values (and subsequently profit values) associated with each JPEG-2000 packet are used. Because of the linear dependence across layers, an additional packet is only useful if the layers above it within the same TRCP tag are also transmitted. Thus, the distortion vector d(x) is calculated by incrementally dropping the layers of TRCP tag x. The modified JPEG-2000 codestream is decoded and the mean-squared error between the modified and original image is calculated. d(x) is the amount the MSE increases the quality layers drop, which are computed by incrementally dropping packets, decoding, and calculating the resulting MSE. Analogously, p(x) is how much the MSE decreases as quality layers are added.

Embodiments of the present invention provide a novel modeling framework for RD optimization of JPEG-2000 images. In one embodiment, dynamic programming is used to find the schedules. By exploiting the dependency structure of JPEG-2000 packets, the described embodiments are able to beat the running time of PCKP. In one embodiment, the RD tradeoff serves as an important lower bound for all other scheduling algorithms.

Figure 3:
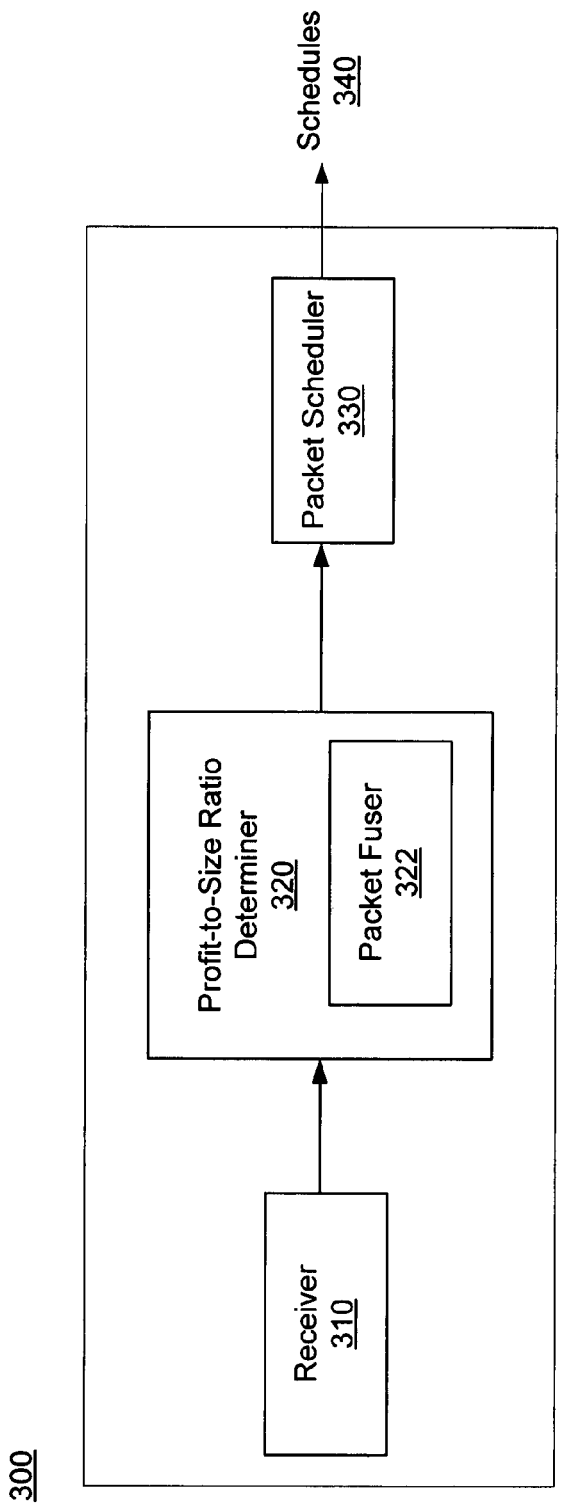
FIG. 3 is a block diagram of a system for scheduling packet transmission, in accordance with various embodiments of the present invention.

FIG. 3 is a block diagram of a system 300 for scheduling packet transmission, in accordance with various embodiments of the present invention. System 300 includes receiver 310, profit-to-size determiner 320, and packet scheduler 330. In one embodiment, profit-to-size determiner includes packet fuser 322. Packet scheduler 330 is operable to determine a plurality of schedules of data packets for a plurality of data rates based at least in part on the profit-to-size ratios utilizing dynamic programming. It should be appreciated that system 300 can be implemented as software, hardware, firmware, or any combination thereof. Moreover, it should be appreciated that system 300 may include additional components that are not shown so as to not unnecessarily obscure aspects of the embodiments of the present invention.

Embodiments of system 300 are operable to perform a process for scheduling packet transmission. FIG. 4 is a flowchart illustrating a process 400 for scheduling data packet transmission, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by system 300 of FIG. 3.

At 410 of FIG. 4, a plurality of data packets are received, wherein at least a portion of the data packets are associated with one media unit, e.g., a tile, and comprise different quality information. In one embodiment, the data packets are packets in accordance with JPEG-2000 coding standard. In one embodiment, a data packet comprises information identifying an associated media unit, resolution level, color component, precinct, and quality level. In one embodiment, the plurality of data packets is received at receiver 310 of FIG. 3.

In one embodiment, the problem of finding RD schedules is formulated as an optimization problem. x is defined as the index of a TRCP tag. $l_x$ is defined as an indicator vector of the layers included in TRCP tag x. In one embodiment, due to the precedence constraint, $l_x$ can only take on values that have ones followed by all zeros, e.g., if m=3 then $l_x = \epsilon\{[0, 0, 0], [1, 0, 0], [1, 1, 0], [1, 1, 1]\}$. d(x) is defined as a length m vector where the $i^{th}$ element equals the change in distortion by not including the $i^{th}$ layer of TRCP tag x. p(x) is defined as a length m vector where the $i^{th}$ element equals the profit of the $i^{th}$ layer of TRCP tag x which is equivalent to the amount we decrease distortion by including that packet. s(x) is defined as a length m vector where the element equals the size of the layer of TRCP tag x.

At 420, profit-to-size ratios for the data packets are determined. In one embodiment, the profit-to-size ratios for the data packets are determined at profit-to-size ratio determiner 320 of FIG. 3. In one embodiment, as shown at 430, if a lower quality level packet associated with the media unit has a larger profit-to-size ratio than a higher quality layer packet associated with the media unit, the lower quality layer packet and the higher quality layer packet are fused into a fused packet. Given properties of the RD schedules, embodiments of the present invention provide for finding embedded schedules. Determination of embedded schedules runs in $\Theta(k \log k)$. In one embodiment, because schedules are fairly correlated, a method of fusing packets is used to find the embedded schedules. In one embodiment, the data packets are fused at packet fuser 322 of FIG. 3.

Figure 5:
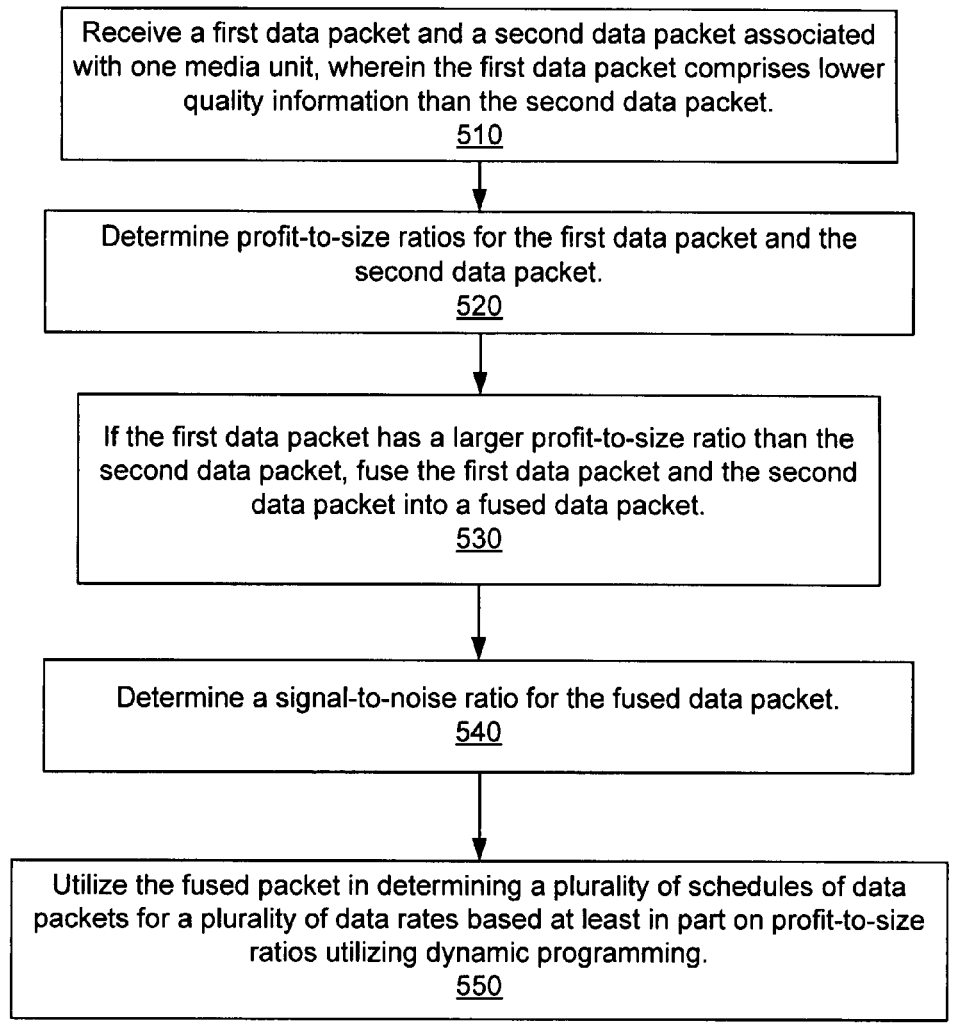
FIG. 5 is a flowchart illustrating a process for fusing data packets, in accordance with one embodiment of the present invention.

FIG. 5 is a flowchart illustrating a process 500 for fusing data packets, in accordance with one embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 500 is performed by packet fuser 322 of FIG. 3.

At 510, a first data packet and a second data packet associated with one media unit, e.g., a tile, are received, wherein the first data packet comprises lower quality information than the second data packet. At 520, profit-to-size ratios for the first data packet and the second data packet are determined. It should be appreciated that the fractional knapsack problem sorts the packets in decreasing order of their profit-to-size ratio. Packets are added to the schedule starting with the packet with the largest profit-to-size ratio and finally ending with the packet with the lowest profit-to-size ratio. However, with this approach it cannot be ensured the precedence constraint will be maintained.

At 530, if the first data packet has a larger profit-to-size ratio than the second data packet, the first data packet and the second data packet are fused into a fused data packet. For example, suppose a pair of Layer 1 and 0 packets violate the precedence constraint. One could either push the Layer 1 packet back to immediately precede its Layer 0 packet or pull the Layer 0 packet ahead to precede the Layer 1 packet. Another approach is to consider the packets as a single packet. By locking the two packets together, their fused profit-to-size ratio can be found, which is the sum of their profits divided by the sum of their sizes. This fused packet will never move ahead of the Layer 1 packet or behind the Layer 0 packet.

In one embodiment, as shown at 540, a signal-to-noise ratio for the fused data packet is determined. In one embodiment, the signal-to-noise ratio for the fused data packet comprises a sum of profits of the first data packet and the second data packet divided by a sum of sizes of the first data packet and the second data packet. For example, let $p_0$, $s_0$, and $p_1$, $s_1$ correspond to the profits and sizes of the Layer 0 and 1 packets, respectively. A problem occurs if Layer 1 precedes Layer 0, that is if $$\frac{p_1}{s_1} > \frac{p_0}{s_0}.$$

With some algebra, we can show that $$\frac{p_1}{s_1} > \frac{p_0 + p_1}{s_0 + s_1} > \frac{p_0}{s_0}.$$

If layers of the same TRCP tag will flip based on their profit-to-size ratio, the two packets are fused together and treated as one packet with a single profit-to-size ratio. The method of scheduling then proceeds using the fused packet. Because sorting can be done in $\Theta(k \log k)$, the running time of the fused-greedy algorithm is $\Theta(k \log k)$.

In one embodiment, as shown at 550, the fused packet is utilized in determining a plurality of schedules of data packets for a plurality of data rates based at least in part on profit-to-size ratios utilizing dynamic programming, e.g., is used in process 400.

With reference to FIG. 4, at 440, a plurality of schedules of the data packets for a plurality of data rates is determined based at least in part on the profit-to-size ratios. In one embodiment, as shown at 450, the plurality of schedules are determined utilizing dynamic programming. In one embodiment, the dynamic programming comprises a Precedence Constraint Knapsack Problem (PCKP). In one embodiment, the plurality of schedules, e.g., schedules 340, are determined at packet scheduler 330 of FIG. 3.

In one embodiment, considering the assumption that distortion values are additive, the distortion incurred the schedule defined by $l_x$ is $D = \Sigma_x d^T(x) l_x$. In terms of profit values $p(x)$: $D = \Sigma_x p^T(X) 1 - \Sigma_x p^T(x) l_x$, where 1 is the vector of all ones. Accordingly, maximizing profit is equivalent to minimizing distortion. The optimization problem, as illustrated in Equation 1, becomes:

$$\max \sum_x p^T(x) l_x \quad (1)$$

$$\text{s.t.} \sum_x s^T(x) l_x \leq R$$

$$l_x \in [1, \ldots, 1, 0, \ldots, 0]$$

In one embodiment, this problem can be solved for a single rate using known solutions to the PCKP. The problem is formulated in a dynamic programming framework which allows solving this problem for rates $1, 2, \ldots, R$ in one execution.

Let $A(i,j)$, defined by Equation 2, be the maximum profit that can be achieved with rate $j$ and schedule of TRCP tags 1 to $i$. Let $B(i,j)$, defined by Equation 3, be the maximum profit with rate $j$ that uses TRCP tag $i$ and the combination of tags 1 to $i-1$. The profit for rate $r$ will be given by $A(n, r)$, for $r=1, 2, \ldots, R$. Maintaining the schedules that achieve these profits in a table will give the corresponding schedule, $S(n, r)$.

$$A(i, j) = \begin{cases} 0, & i = 0 \text{ or } j = 0; \\ A(i-1, j), & s^T(i)[1, 0, \ldots, 0] \geq R; \\ \max\{A(i-1, j), B(i, j)\}, & \text{otherwise.} \end{cases} \quad (2)$$

$$B(i, j) = \max_{l_i} \{A(i-1, j - s^T(i) l_i) + p^T(i) l_i\} \quad (3)$$

The first case in $A(i,j)$ is when nothing is sent. The second case is when the top layer of tag $i$ is too big to fit, so no packets from TRCP tag $i$ are used. The third case decides whether or not to use TRCP tag $i$. The precedence properties of the layers are maintained by maximizing $B(i,j)$ over allowable layer combinations within TRCP tag $i$.

In one embodiment, as shown at 442, a plurality of schedules of the data packets is determined for a plurality of data rates based at least in part on a quality information precedence constraint of the data packets. In one embodiment, as described above and shown at 450, dynamic programming is used to determine the plurality of schedules. In one embodiment, the precedence constraint requires that a schedule comprising a higher quality level packet associated with the media unit also comprises at least a lower quality level packet associated with the media unit. In one embodiment, as shown at 452, the data packets are arranged in order of profit-to-size ratio. At 454, the PCKP is solved for the data packets.

The dynamic programming provides the resulting RD curves and the schedules for each rate. In one embodiment, using the dynamic programming in Equation 2, the schedule that corresponds to the distortion value for each rate is found. Looking over all of these schedules, the frequency of a packet is defined as the number of times the packet was used in all of the schedules. In one embodiment, the solution to the fractional knapsack problem uses profit-to-size ratios, which are defined as $p(x)/s(x)$ for packet $x$.

The precedence constraint requires that quality layers of packets for the same media unit are dependent on each other. A schedule including a higher level packet associated with a media unit must also include all lower level packets associated with the same media unit. It should be appreciated that the due to the dependencies across layers, a lower layer packet (e.g., $L_0$ of FIG. 2) may be used more often simply to allow the more important higher layer packet (e.g., $L_1$ of FIG. 2) to be included.

Embodiments of the present invention formulate the problem of finding RD schedules as a dynamic program. By looking at the schedules, it is evident that the precedence constraint may effect the policy. Some packets which otherwise would not be important are used very frequently because other packets are dependent on them. By solving for the schedule, there is now a tight lower bound for all possible schedules.

At 460, a set of embedded schedules is determined based at least in part on the plurality of schedules, wherein an embedded schedule for a particular rate includes packets for the particular rate and packets for lower rates. Schedules that are embedded within each other is beneficial for real world applications such as rapidly adapting the packet selection for dynamic network conditions. In one embodiment, the present invention provides for finding a set of embedded schedules for all rates. In one embodiment, the set of embedded schedules is determined at packet scheduler 330 of FIG. 3.

Suppose there are two schedules, $S(R_1)$ and $S(R_2)$, with corresponding rates, $R_1$ and $R_2$ such that $R_1 < R_2$. The correlation, C, between $S(R_1)$ and $S(R_2)$ is defined as the fraction of packets from $S(R_1)$ that are contained in $S(R_2)$. In other words, $C[S(R_1)]$, $$S(R_2)] = \frac{|S_{opt}(R_1) \cap S_{opt}(R_2)|}{S_{opt}(R_1)}.$$

If all the packets of $S(R_1)$ are in $S(R_2)$, then the schedules are fully embedded and correlation is 1.

The average correlation between schedules is plotted as a function of the change in rate, $R_2-R_1$. At low rates, the solution will select very small packets that are likely to have low profit-to-size ratios because they are the only packets that will fit in the rate constraint. As $\Delta R$ increases, $R_1$ is low and the packets in $S(R_1)$ are unlikely to be in $S(R_2)$. However, at high $\Delta R$, there is an increase in average correlation. This is because $R_2$ is large and nearly all packets in the image are in $S(R_2)$. This implies that nearly all of the packets of $S(R_1)$ are also included. The sharp decrease in average correlation at extremely large $\Delta R$ is again due to the very small packets in $S(R_1)$. With such large $\Delta R$, it is likely that there is only one or two packets in $S(Ri)$. Because these packets are so small they will be among the last packets incorporated into $S(R_2)$. And because there are so few packets at $R_1$, if they are not included, the correlation drops significantly.

How the correlation of schedules varies as a function of rate with $\Delta R$ fixed is also considered, e.g., the schedules for R and R+$\Delta R$ are examined as R varies. In one embodiment, as the rate increases, new packets can be added. In one embodiment, small packets are added until there is enough rate to kick out and replace them with a larger, more important packet. This is what decreases the correlation. Also, some TRCP tags have very small packets. So, with incremental increase in rate, Layer 0 of this tag will be added, followed by Layer 1 and finally Layer 2. Because these packets are so small they are generally not in $S(R_2)$.

Figure 6:
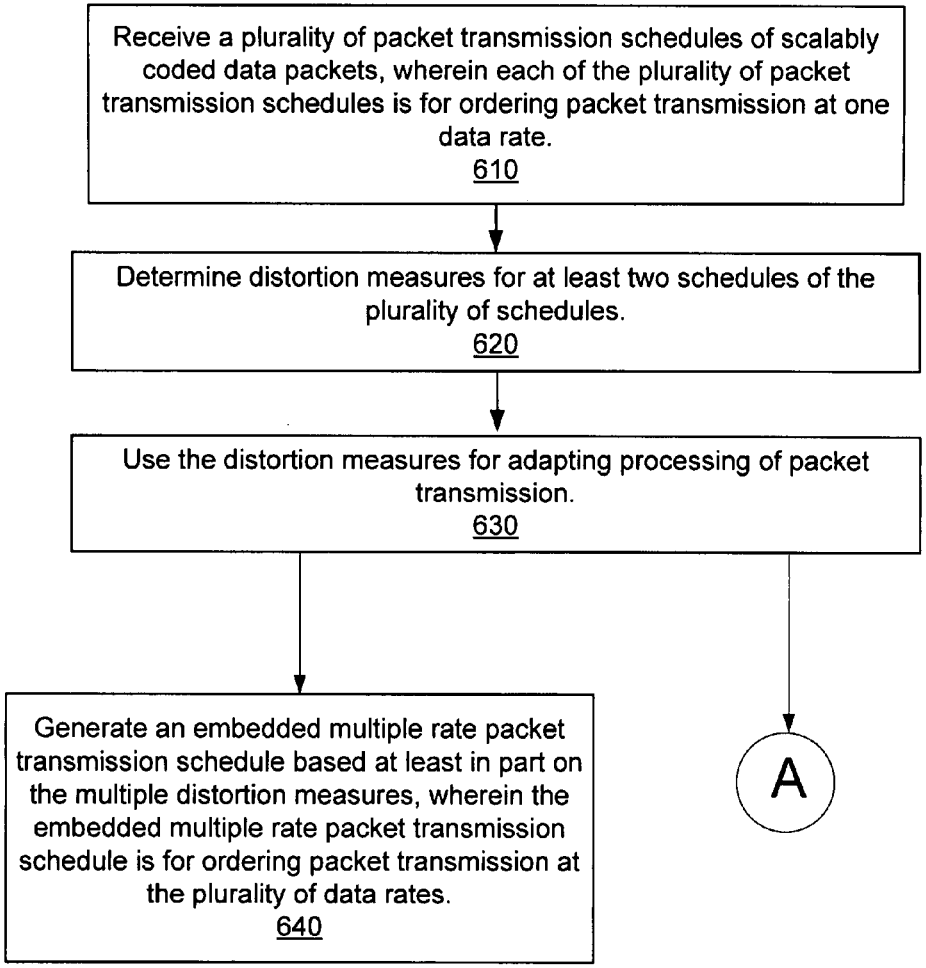
FIG. 6 is a flowchart illustrating a process for selecting a packet transmission schedule, in accordance with one embodiment of the present invention.

Embodiments of the present invention use multiple distortion measures to measure performance relative to a target device. FIG. 6 is a flowchart illustrating a process 600 for selecting a packet transmission schedule, in accordance with one embodiment of the present invention. In one embodiment, process 600 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 600 is performed by packet scheduler 330 of FIG. 3.

At 610 of process 600, a plurality of packet transmission schedules of scalably coded data packets are received. In one embodiment, each of the plurality of packet transmission schedules is for ordering packet transmission at one data rate. In one embodiment, the plurality of packet transmission schedules are generated according to process 400 of FIG. 4.

At 620, a distortion measure is determined for at least a portion of the plurality of schedules. To calculate the distortion measures, packet importance compared to a benchmark image is evaluated. In one embodiment, the benchmark image is the original image. In another embodiment, the benchmark image is the original image downsampled to different resolutions. In one embodiment, packets are dropped incrementally, the image is decoded and, where applicable, the image is downsampled, and the resulting MSE is calculated relative to the appropriate benchmark image. Thus, each packet has multiple distortion values associated with it: one for each resolution. In one embodiment, an embedded high resolution schedule is generated by applying fused packets to the high resolution metric. In one embodiment, an embedded low resolution schedule is generated by applying fused packets to the low resolution metric It should be appreciated that many different downsampling methods exist, and that embodiments of the present invention are applicable to any downsampling methodology or technique. Once the distortion values are computed, the rest of the analysis follows identically. For example, linear downsampling may be implemented, such as pixel averaging, or a Scalable Video Coding (SVC) 13-tap downsampling filter.

Scalable coders typically allow low resolution images to be constructed by decoding only the low resolution packets or equivalently by downsampling a full size decoded image with the low resolution wavelet filter. However, it cannot be guaranteed that all devices will downsample with the wavelet filter. Embodiments of the present invention utilize embedded schedules including fused packets, as described above. Accordingly, embodiments of the present invention select packets from all packets, not just the low resolution packets. For instance, by selecting from all packets, embodiments of the present invention provide gains in the peak signal-to-noise ratio (PSNR).

Typically, embedded schedules are optimized for high resolution viewing even at low rates, where the viewer is likely to have a low resolution display. When an image is optimized for high resolution viewing, edges are important, and packets corresponding to edges will be transmitted. However, once the image is reduced in size, these edges are no longer important. Therefore, instead of transmitting information to improve the low resolution image quality, bytes are wasted on packets that cannot be seen on a low resolution display, causing a drop in PSNR. By utilizing multiple distortion measures, embodiments of the present invention provide an embedded schedule for providing improved performance for multiple transmission rates.

Various embodiments of the present invention use the multiple distortion measures for adapting processing of packet transmission, as shown at 630. Embodiments of the present invention provide embedded schedules given multiple distortion measures. In one embodiment, as shown at 640, an embedded multiple rate packet transmission schedule based at least in part on the multiple distortion measures is generated, wherein the embedded multiple rate packet transmission schedule is for ordering packet transmission at the plurality of data rates. Embedded schedules have correlation, defined as the fraction of packets common in both schedules, equal to 1. For instance, correlation is fairly varied between schedules optimized at different resolutions. At medium rates, the correlation may be very low, which is why there may be PSNR gaps around the same rates. At high rates, most packets are included in the schedule, so correlation is close to 1. At low rates, the same few packets will create the foundation for the image, regardless of the viewing resolution, so correlation equals 1. It should be appreciated that selection of different downsampling filters will result in varied correlation.

It should also be appreciated that packet selection at each distortion metric is very different, and optimizing for the high resolution measure does not equate to the selection of all low resolution packets. For example, a packet which is not important for the low resolution image and is included only at very high rates can be quite important for the high resolution image. Likewise, packets that are important in the low resolution image could be relatively unimportant at high resolution.

Embodiments of the present invention provide an embedded packet transmission schedule for improved packet transmission at various transmission rates. Schedules are evaluated for multiple distortion rates and are used to generate high-performance embedded schedules.

At a given rate, there may be multiple users who wish to view the content at low, medium, and high resolution. At other rates, for instance low rates, users may only view the content on low resolution displays. Embodiments of the present invention are directed toward a fixed switching rate, $R_s$, where the distortion metric switches from low to high resolution. For all schedules with $R<R_s$, MSE is measured against the low resolution image whereas for schedules with $R>R_s$, MSE is measured against the high resolution image. Because packets have different importance at low and high resolutions, optimizing the schedule at low resolution for rates less than $R_s$ and then switching to high resolution will give suboptimal performance and multiple distortion measures must be accounted for. In one embodiment, it is assumed that the probability of a user's channel having rate-constraint R is uniformly distributed from 0 to $R_{max}$, where $R_{max}$ is the total size of the coded image.

In one embodiment, if $R_s=R_{max}$, all distortions are measured by the low resolution distortion metric and the schedule is given by utilizing fused packets on the low resolution profit values. In one embodiment, if $R_s=0$, the schedule is determined by utilizing fused packets on the high resolution profit values. It should be appreciated that in accordance with embodiments of the present invention, fused packets are used to ensure that the precedence constraint is maintained for providing embedded schedules. Given these schedules and $R_s$, schedules that switch between them are generated in one embodiment.

In one embodiment, given a switching rate, $R_s$, the schedule that minimizes distortion over all rates and users is found. In one embodiment, in order to evaluate and compare the performance of a schedule, an Integral Distortion, $D_I(S)$, performance metric is used. The Integral Distortion metric is defined as the sum of the distortion of the schedule at each rate, and is shown in Equation 4.

$$D_I(S) = \sum_{R=0}^{R_s} d_L(S, R) + \sum_{R=R_s}^{R_{max}} d_H(S, R) \quad (4)$$

where S is the schedule, $R_{max}$ the total number of bytes in the image, $d_L(S, R)$ is the distortion measured at low resolution for schedule S evaluated at rate R, and $d_H(S, R)$ is the distortion measured at high resolution for schedule S evaluated at rate R.

$$\frac{D_I(S)}{R_{max}}$$

is the expected distortion for uniformly distributed rates; therefore, minimizing $D_I$ is equivalent to minimizing the expected distortion. Because distortion is minimized, high-performing schedules will have very low Integral Distortion. This measure provides a systematic way to compare different schedules. If $D_I(S_1)<D_I(S_2)$, then it is determined that $S_1$ is a better schedule than $S_2$. This approach can be straightforwardly extended to more resolutions and non-uniform probability of viewing.

Embodiments of the present invention generate embedded schedules based at least in part on an evaluation of schedules using multiple distortion rates. The generated embedded schedules utilizes fused packets and a changing rate, $R_c$.

In one embodiment, schedules are generated by starting with the low resolution schedule and then when the distortion metric changes at $R_s$, the remaining packets are added into the schedule according to the high resolution schedule. In this case, the changing rate would be equal to the switching rate, $R_c=R_s$. $R_c$ is defined as the rate at which the change from low resolution to high resolution scheduling occurs, e.g., for $R<R_c$ the solution from the low resolution schedule with fused packets is used, and for $R>R_c$, the high resolution fused packet schedule is used.

Figure 7:
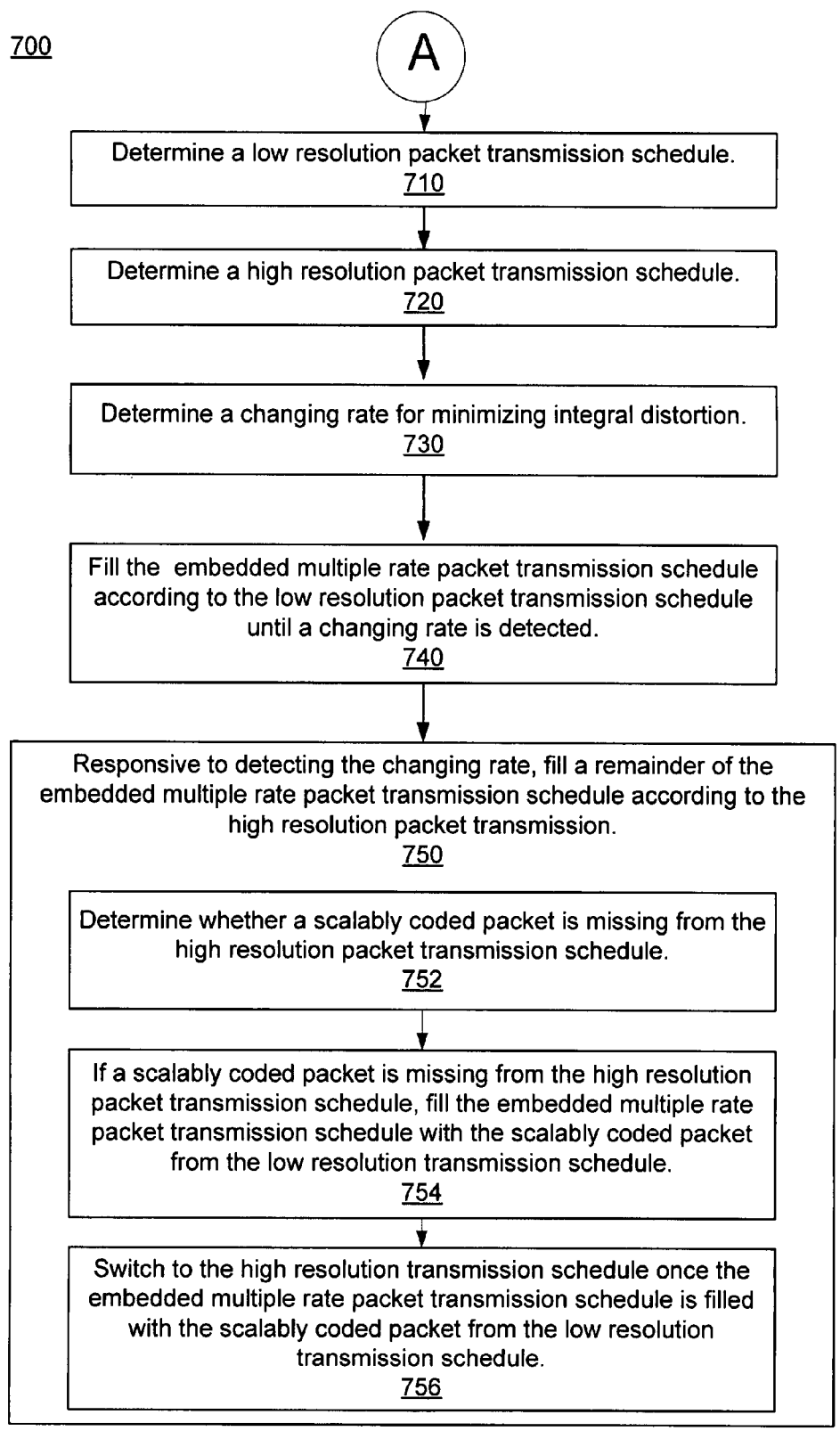
FIG. 7 is a flowchart illustrating a process for generating an embedded schedule using multiple schedules, in accordance with an embodiment of the present invention.

In another embodiment, in using the multiple distortion measures for adapting processing of packet transmission of 630, process 600 proceeds to 710 of process 700 of FIG. 7. FIG. 7 is a flowchart illustrating a process for generating an embedded schedule using multiple schedules, in accordance with an embodiment of the present invention. In one embodiment, process 700 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 700 is performed by packet scheduler 330 of FIG. 3.

In one embodiment, the scheduling includes determining a low resolution packet transmission schedule with fused packets, as shown at 710, and determining a high resolution packet transmission schedule with fused packets, as shown at 720. In one embodiment, the fused packets are generated according to process 500 of FIG. 5. In one embodiment, a changing rate is determined for minimizing integral distortion, as shown at 730 and as described above. At 740, the embedded schedule is filled according to the low resolution packet transmission schedule until the schedule has $R_c$ bytes, e.g., the changing rate is detected. At 750, the remaining packets in the embedded schedule are filled according to the high resolution packet transmission schedule.

In one embodiment, process 700 is operable to determine whether any data packets might be lost in switching from the low resolution packet transmission schedule to the high resolution packet transmission schedule, and to compensate for any detected missing packets. For example, a packet might occur later after the changing rate in the low resolution packet transmission schedule but before the changing rate in the high resolution packet transmission schedule. At 752, it is determined whether a scalably coded packet is missing from the high resolution packet transmission schedule. If a packet is missing from the high resolution packet transmission schedule, as shown at 754, the embedded multiple rate packet transmission schedule is filled with the missing packet from the low resolution transmission schedule. Once the embedded multiple rate packet transmission schedule is filled with the missing packet, the embedded multiple rate packet transmission schedule switches to the high resolution packet transmission schedule, as shown at 756.

FIG. 8 is a graph illustrating an example plot of PSNR versus transmission rate, in accordance with an embodiment of the present invention. As shown, the PSNR versus Rate curves as it is swept over various values of $R_c$ for a fixed switching rate, $R_s$. As $R_c$ is decreased and switched to the high resolution schedule earlier, the performance of the low resolution schedules decreases. However, the performance of the high resolution schedules improves.

It should be appreciated that sweeping over different values of $R_c$ has an effect on the integral distortion. FIGS. 9A and 9B are graphs illustrating example plots of integral distortion versus changing rate, in accordance with an embodiment of the present invention. Empirically, for various switching rates, there is a unique $R_c$ that corresponds to the minimum integral distortion. The optimal changing rate, $R^*_c$, is dependent on the switching rate, $R_s$, as well as the image/packet properties. However, given packet profits and $R_s$, $R_c$ can be searched to find a changing rate which minimizes the integral distortion.

Embodiments of the present invention provide for generating an embedded packet transmission schedule using multiple distortion measures to capture the need of users with varying display capabilities. By capturing the viewing needs of all users, quality of service can vastly be improved. Embodiments of the present invention provide an embedded schedule using low resolution distortion measures at low rates and switching to high resolution distortion measures at high rates. Embodiments of the present invention provide for evaluating schedules for JPEG2000 images with multiple distortion measures, resulting in gains in PSNR performance over conventional scheduling techniques.

In summary, embodiments of the present invention provide for the selecting an embedded packet transmission schedule operable at multiple transmission rates. In various embodiments, the present invention provides embedded schedules based at least in part on an evaluation of schedules using multiple distortion rates. In one embodiment, the embedded packet transmission schedule is generated by generating fused packets for packet in violation of the dependency constraint.

Various embodiments of the present invention, utilizing multiple distortion measures, are thus described. While the present invention has been described in particular embodiments, it should be appreciated that the present invention should not be construed as limited by such embodiments, but rather construed according to the below claims.

What is claimed is:

1. A method for determining multiple distortion measures, said method comprising:
   receiving a plurality of packet transmission schedules of scalably coded data packets at a computer, wherein each of said plurality of packet transmission schedules is for ordering packet transmission of said scalably coded data packets at one data rate;
   determining distortion measures for at least two schedules of said plurality of schedules at said computer;
   using said distortion measures for adapting processing of packet transmission;
   determining a low resolution packet transmission schedule;
   determining a high resolution packet transmission schedule;
   wherein said low resolution packet transmission schedule and said high resolution packet transmission schedule comprise at least one fused packet, wherein said fused packet comprises data from a plurality of data packets previously in violation of a precedence constraint,
   wherein said fused packet comprises said data from a lower quality level packet associated with a media unit and a higher quality level packet associated with said media unit if said lower quality level packet has a larger profit-to-size ratio or distortion-to-size ratio than said higher quality layer packet;
   filling an embedded multiple rate packet transmission schedule according to said low resolution packet transmission schedule until a changing rate is detected; and
   responsive to detecting said changing rate, filling a remainder of said embedded multiple rate packet transmission schedule according to said high resolution packet transmission schedule.

2. The method of claim 1 wherein said scalably coded data packets are selected from a listing consisting essentially of: audio-based data packets, image based data packets, graphics data packets, video-based data packets, text-based data packets, and web page-based data packets.

3. The method of claim 1 further comprising:
   generating an embedded multiple rate packet transmission schedule based at least in part on said distortion measures, wherein said embedded multiple rate packet transmission schedule is for ordering packet transmission at said plurality of data rates.

4. The method of claim 1 further comprising:
   determining a changing rate for minimizing integral distortion.

5. The method of claim 1 wherein said filling a remainder of said embedded multiple rate packet transmission schedule according to said high resolution packet transmission comprises:
   determining whether a scalably coded packet is missing from said high resolution packet transmission schedule;
   if a scalably coded packet is missing from said high resolution packet transmission schedule, filling said embedded multiple rate packet transmission schedule with said scalably coded packet from said low resolution transmission schedule; and
   switching to said high resolution transmission schedule once said embedded multiple rate packet transmission schedule is filled with said scalably coded packet from said low resolution transmission schedule.

6. The method of claim 1 wherein said scalably coded data packets are packets in accordance with JPEG-2000 coding standard.

7. One or more non-transitory computing device readable media for storing instructions that when executed by one or more processors perform a method for determining multiple distortion measures, said method comprising:
   receiving a plurality of packet transmission schedules of scalably coded data packets, wherein each of said plurality of packet transmission schedules is for ordering packet transmission of said scalably coded data packets at one data rate, wherein one of said plurality of packet transmission schedules comprises a first data packet and a second data packet, wherein said first data packet comprises lower quality information than said second data packet;
   determining distortion measures for at least two schedules of said plurality of schedules; and
   if a first data packet associated with one media unit has a larger profit-to-size ratio or distortion-to-size ratio than a second data packet associated with said media unit, wherein said first data packet comprises lower quality information than said second data packet, fusing said first data packet and said second data packet into a fused data packet.

8. The one or more computing device readable media as recited in claim 7 wherein said method further comprises:

generating an embedded multiple rate packet transmission schedule based at least in part on said distortion measures, wherein said embedded multiple rate packet transmission schedule is for ordering packet transmission at said plurality of data rates.

9. The one or more computing device readable media as recited in claim 7 wherein said method further comprises:
determining a low resolution packet transmission schedule;
determining a high resolution packet transmission schedule;
filling said embedded multiple rate packet transmission schedule according to said low resolution packet transmission schedule until a changing rate is detected; and
responsive to detecting said changing rate, filling a remainder of said embedded multiple rate packet transmission schedule according to said high resolution packet transmission.

10. The one or more computing device readable media as recited in claim 9 wherein said method further comprises:
determining a changing rate for minimizing integral distortion.

11. The one or more computing device readable media as recited in claim 9 wherein said filling a remainder of said embedded multiple rate packet transmission schedule according to said high resolution packet transmission comprises:
determining whether a scalably coded packet is missing from said high resolution packet transmission schedule;
if a scalably coded packet is missing from said high resolution packet transmission schedule, filling said embedded multiple rate packet transmission schedule with said scalably coded packet from said low resolution transmission schedule; and
switching to said high resolution transmission schedule once said embedded multiple rate packet transmission schedule is filled with said scalably coded packet from said low resolution transmission schedule.

12. The one or more computing device readable media as recited in claim 9 wherein said low resolution packet transmission schedule and said high resolution packet transmission schedule comprise at least one fused packet, wherein said fused packet comprises data from a plurality of data packets previously in violation of a precedence constraint.

* * * * *